United States Patent
Crawford et al.

(10) Patent No.: US 11,808,354 B2
(45) Date of Patent: Nov. 7, 2023

(54) SAMPLE SHAKER SYSTEM WITH SEALED AIRFLOW

(71) Applicant: SARTORIUS BIOANALYTICAL INSTRUMENTS, INC., Bohemia, NY (US)

(72) Inventors: Colin Crawford, Oakland, CA (US); Yuri Krasov, Castro Valley, CA (US)

(73) Assignee: Sartorius Bioanalytical Instruments, Inc., Bohemia, NY (US)

( * ) Notice: Subject to any disclaimer, the term of this patent is extended or adjusted under 35 U.S.C. 154(b) by 337 days.

(21) Appl. No.: 17/199,048

(22) Filed: Mar. 11, 2021

(65) Prior Publication Data
US 2022/0291092 A1    Sep. 15, 2022

(51) Int. Cl.
| | |
|---|---|
| *F16J 15/02* | (2006.01) |
| *F16L 9/00* | (2006.01) |
| *F16L 11/12* | (2006.01) |
| *F16L 11/11* | (2006.01) |
| *B01F 35/90* | (2022.01) |
| *G01N 1/28* | (2006.01) |

(52) U.S. Cl.
CPC .......... *F16J 15/025* (2013.01); *B01F 2035/98* (2022.01); *F16L 9/003* (2013.01); *F16L 11/111* (2013.01); *F16L 11/121* (2013.01); *G01N 1/286* (2013.01); *G01N 2001/2866* (2013.01)

(58) Field of Classification Search
CPC ..... F16J 15/025; B01F 2035/98; B01F 31/22; B01F 35/92; F16L 11/111; F16L 11/121; F16L 9/003; G01N 1/286; G01N 2001/2866
See application file for complete search history.

(56) References Cited

U.S. PATENT DOCUMENTS

| 3,002,895 A | 10/1961 | Freedman |
| 3,515,168 A * | 6/1970 | Simon ................... E01H 1/0836 15/340.1 |

(Continued)

FOREIGN PATENT DOCUMENTS

| CN | 111133237 A * | 5/2020 | ............. F16J 15/025 |
| DE | 1273928 B | 7/1968 | |

(Continued)

OTHER PUBLICATIONS

Machine Translation DE1273928B (Year: 2023).*

(Continued)

*Primary Examiner* — David L Singer
(74) *Attorney, Agent, or Firm* — McAfee & Taft (57) ABSTRACT

A sealed airflow system suitable for use with a sample shaker assembly. The sealed airflow system includes at least one component which accommodates movement of the sample shaker assembly while maintaining an air tight assembly between components of the sealed air flow system. A compliant sliding seal compensates for movement of the sample shaker assembly with regard to an air intake side of the sealed airflow control system. Additionally, a flexible conduit provides an air tight passage between an outlet of the sealed airflow control system and an exhaust port. The flexible conduit compensates for movement of the sample shaker assembly in a manner that does not permit unwanted airflow into or out of sealed airflow control system.

25 Claims, 9 Drawing Sheets

(56) References Cited

U.S. PATENT DOCUMENTS

| | | | |
|---|---|---|---|
| 5,511,879 A | | 4/1996 | Fletcher |
| 7,338,199 B2 | | 3/2008 | Hafner |
| 7,832,921 B2 | | 11/2010 | Malin |
| 8,226,291 B2 | | 7/2012 | Zamirowski et al. |
| 8,323,588 B2 | | 12/2012 | Hoyer et al. |
| 8,550,696 B2 | | 10/2013 | Schmidt et al. |
| 8,827,540 B2 | | 9/2014 | Schafrinski et al. |
| 10,279,327 B2 | | 5/2019 | Corves et al. |
| 2006/0081635 A1 | * | 4/2006 | Matsutori ......... H01L 21/67769 220/806 |
| 2007/0169955 A1 | * | 7/2007 | Pape .................... H02B 1/044 174/50 |
| 2019/0126221 A1 | | 5/2019 | Hawrylenko |
| 2019/0257066 A1 | * | 8/2019 | Sweeney ................ F16J 15/025 |
| 2020/0363438 A1 | | 11/2020 | Glezer et al. |

FOREIGN PATENT DOCUMENTS

| | | | | |
|---|---|---|---|---|
| DE | 1808568 A1 | | 6/1970 | |
| DE | 102014213710 A1 | * | 1/2016 | ............ B60T 13/567 |
| DE | 202020105719 | | 11/2020 | |
| EP | 3315285 A1 | * | 5/2018 | ............ B29C 48/10 |
| EP | 3741276 A1 | * | 11/2020 | ............... A47L 9/00 |
| FR | 1536875 A | | 8/1968 | |
| GB | 1203888 A | | 9/1970 | |
| WO | WO-2006087948 A1 | * | 8/2006 | ............ F16J 15/025 |
| WO | WO-2017158057 A1 | * | 9/2017 | ............ F16J 15/025 |

OTHER PUBLICATIONS

Machine Translation DE1808568A1 (Year: 2023).*
Milbury et al., Friction Coefficient of Material, Piping Designer (Year: 2019).*

* cited by examiner

SAMPLE SHAKER SYSTEM WITH SEALED AIRFLOW

BACKGROUND

Motorized sample shakers are commonly used to induce mixing in the microplate wells of sample trays. Additionally, thermoelectric coolers are commonly used to maintain the sample tray and samples within a defined temperature range. Frequently, waste heat must be removed from the system in order to maintain the defined temperature range. Typically, heat sinks and fans provide for heat removal from the system. However, inconsistent heat removal due to uncontrolled airflow across heat sinks can produce sample tray temperatures outside of the desired range. To provide enhanced control over the temperature of the sample tray, the system disclosed herein precludes undesired leakage of air into and out of a sealed airflow system.

SUMMARY

In one aspect, the present disclosure provides a sealed airflow system. The sealed airflow control system comprises an air intake housing, which may also include a first fan mount. The system further includes an air duct housing having an air inlet in fluid communication with the air intake housing and an air outlet in fluid communication with the air inlet. The air duct housing directs flowing air from the air intake housing to the air outlet while precluding the ingress of air from the ambient environment at any location other than the air inlet. Additionally, the air intake house precludes loss of air between the air inlet and air outlet. A compliant sliding seal positioned between the air inlet and the air intake housing accommodates movement between the air inlet and the air intake housing. The compliant sliding seal has a lower surface, a central opening which provides fluid communication through the compliant sliding seal and between the air inlet and the air intake housing. The compliant sliding seal also has an outer wall.

The present disclosure further describes alternative embodiments such as a sealed airflow system wherein the compliant sliding seal includes a sealing flange projecting outwardly and downwardly from the outer wall of the compliant sliding seal. The sealing flange having a length sufficient to define a gap between the lower surface of the compliant sliding seal and the upper surface of the air intake housing.

DETAILED DESCRIPTION

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

The present disclosure may be understood more readily by reference to these detailed descriptions. For simplicity and clarity of illustration, where appropriate, reference numerals may be repeated among the different figures to indicate corresponding or analogous elements. The following description is not to be considered as limiting the scope of the embodiments described herein. The drawings are not necessarily to scale and the proportions of certain parts may have been exaggerated to better illustrate details and features of the present disclosure. Also, the phraseology and terminology employed herein is for the purpose of description and should not be regarded as limiting except where indicated as such.

Throughout this disclosure, the terms "about", "approximate", and variations thereof, are used to indicate that a value includes the inherent variation or error for the device, system, or measuring method being employed as recognized by those skilled in the art.

Figure 1:
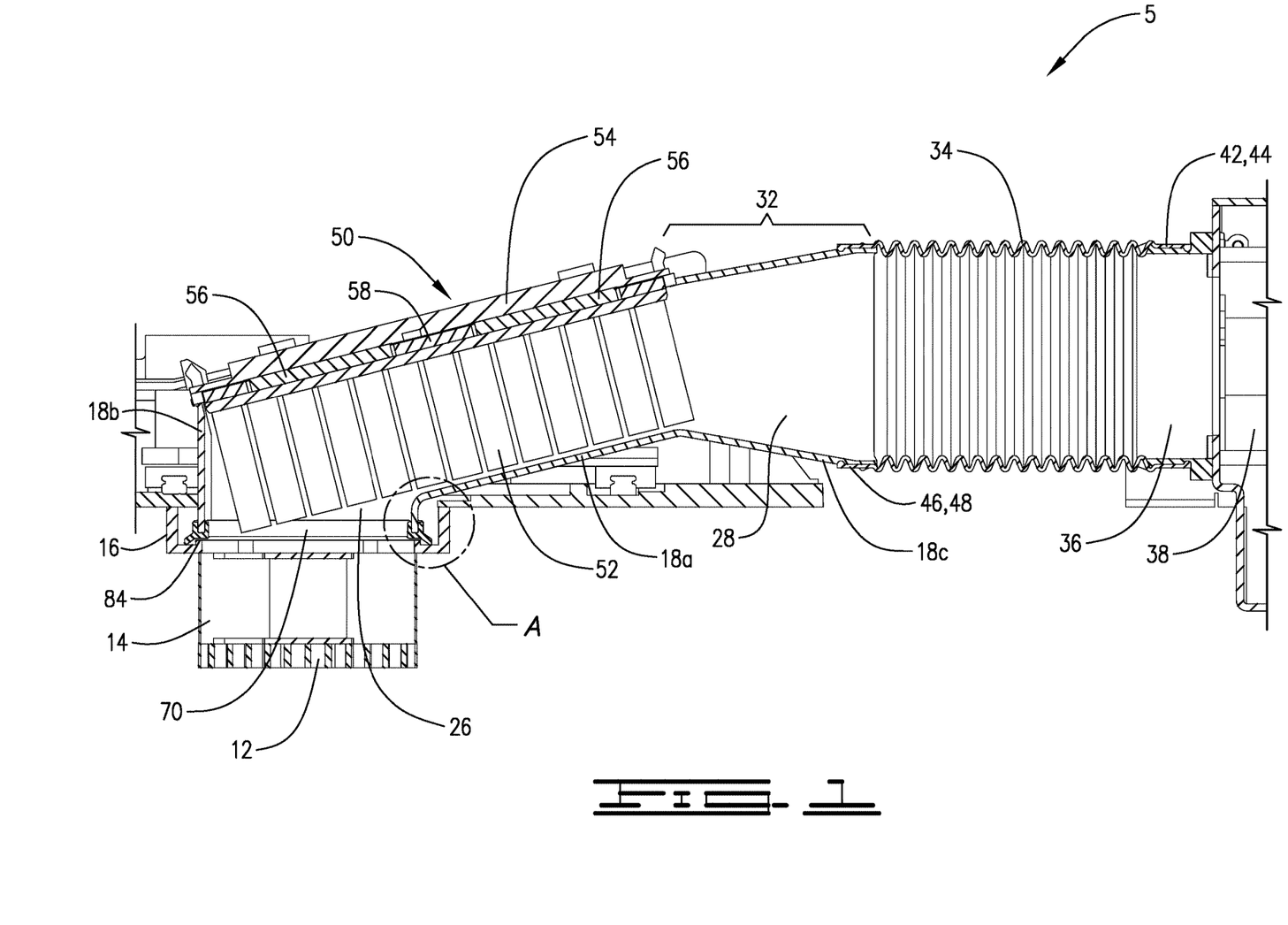
FIG. 1 is a side cut-away view of the motorized sample shaker system with a sealed airflow system.

With references to the FIGS., disclosed is a sealed airflow system 5 configured to manage airflow over a plurality of thermal conductors 52. Thermal conductors 52 are also known to those skilled in the art as heat sinks. Thus, thermal conductors 52 provide the ability to move heat away from a surface or a component. As depicted in FIG. 1, one desired use of sealed airflow system 5 is in connection with temperature management of a sample shaker assembly 50. In this embodiment, sealed airflow system 5 supports a sample shaker assembly 50. The functionality of sealed airflow system 5 will be described in connection with sample shaker assembly 50; however, sealed airflow system 5 may be used in connection with other apparatus which require thermal heat control while accommodating movement of components of sealed airflow system 5.

Sample shaker assembly 50 includes a shaker plate 54 having a plurality of sample wells, not shown, in the upper surface of shaker plate 54. A motor, not shown, moves shaker plate 54 in order to provide mixing of the samples in the sample wells. Typically, the motor will move the shaker plate 54 in an orbital manner, i.e. in two axes of movement. Sample shaker assembly 50 also includes at least one temperature sensor, not shown, one or more thermal control devices 56, one or more optional insulators 58 and one or more thermal conductors 52. A suitable control system receives data from the temperature sensor and uses the data to manage the operation of thermal control device(s) 56. Additionally, the control system manages operation of one or more fans.

As depicted in FIG. 1, sealed airflow system 5 includes an air intake housing 12 in fluid communication with a first fan mount 16. Air intake housing 12 and first fan mount 16 may be a single component or separate components joined together. Thus, references to first fan mount 16 are also references to air intake housing 12. For consistency with the FIGS., the following description refers to first fan mount 16; however, if a first fan 14 is not used, then air intake housing 12 can be substituted for first fan mount 16. Under such conditions, air intake housing 12 will have the same configuration as the following description of first fan mount 16.

First fan mount 16 supports first fan 14. The location of the fan is optional, as such sealed airflow system will operate satisfactorily with either first fan 14 or with a second fan 38 located downstream of air duct outlet 28, for example at exhaust port 36 or both first fan 14 and second fan 38. In the embodiment depicted in FIG. 1, first fan 14 pulls air from the external environment into sealed airflow system 5. An air duct housing 18 receives air from first fan 14. Air duct housing 18 may be a single integral component or may consist of a plurality of panels 18a, 18b, 18c secured to one another in an air tight manner. The manner of joining the panels to one another is not critical. Rather, the primary factor being that air duct housing 18 precludes entry of additional air into sealed airflow system 5 and loss of air from sealed airflow system 5. Air duct housing 18 has an air duct inlet 26 and an air duct outlet 28. Air duct outlet 28 may optionally be configured as a pressure reduction region 32. Use of pressure reduction region 32 will depend on the volume of air passing through sealed airflow system 5, the number of fans and the configuration of exhaust port 36 included in sealed airflow system 5. Additionally, the downward sloping configuration of air duct housing 18 is optional. The angular configuration of air duct housing 18 may range from horizontal to a suitable angle as determined by the equipment utilizing sealed airflow system 5. For example, air duct housing may have an angle relative to sample shaker assembly of about 20°. This angle may vary depending on the nature of the unit supported by or installed into air duct housing 18.

As depicted in FIGS. 1-3A, air duct inlet 26 is in fluid communication with first fan mount 16 and first fan 14. However, air duct housing 18 is not in direct physical contact with first fan mount 16. Rather, a compliant sliding seal 70 is positioned between air duct housing 18 and first fan mount 16. The end 22 of air duct housing 18 engages compliant sliding seal 70. In turn compliant sliding seal 70 engages the upper surface 96 of first fan mount 16. As depicted in FIGS. 1-4, one configuration for providing an air tight seal between air duct housing 18 and compliant sliding seal 70 utilizes inner and outer walls 72, 74. In the currently depicted embodiment, inner and outer walls 72, 74 define a slot 76 suitable for receiving end 22 of air duct housing 18. However, the manner in which end 22 engages compliant sliding seal 70 can be reversed. In other words, end 22 may be provided with a slot, not shown, which receives the upper end of a single wall carried by compliant sliding seal 70. Other configurations are also contemplated such as overmolding compliant sliding seal 70 onto end 22. The primary consideration for the contact point between compliant sliding seal 70 and end 22 is the provision of an air tight seal between end 22 of air duct housing 18 and first fan mount 16.

Figure 4:
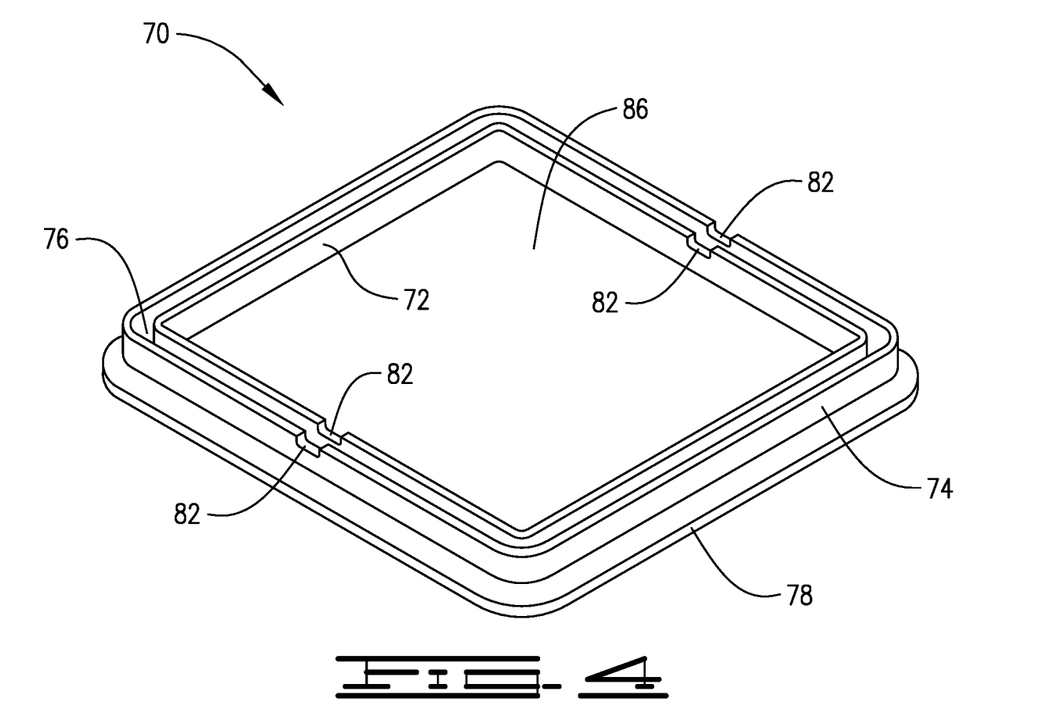
FIG. 4 is a perspective view of the compliant sliding seal.

Sample shaker assembly 50 will generally have motion in two axes of movement, i.e. orbital motion. To provide for an air tight seal without loss or gain of airflow through the sealed airflow system, at least one point of contact interface must permit movement between two components. In the disclosed sealed airflow system 5, compliant sliding seal 70 has sufficient flexibility to provide an air tight seal between air duct housing 18 and first fan mount 16 while also accommodating the mixing motion imparted by the motor associated with sample shaker assembly 50. As depicted in FIG. 4, compliant sliding seal 70 has a central opening 86 which provides fluid communication between air duct housing 18 and first fan mount 16.

Figure 3:
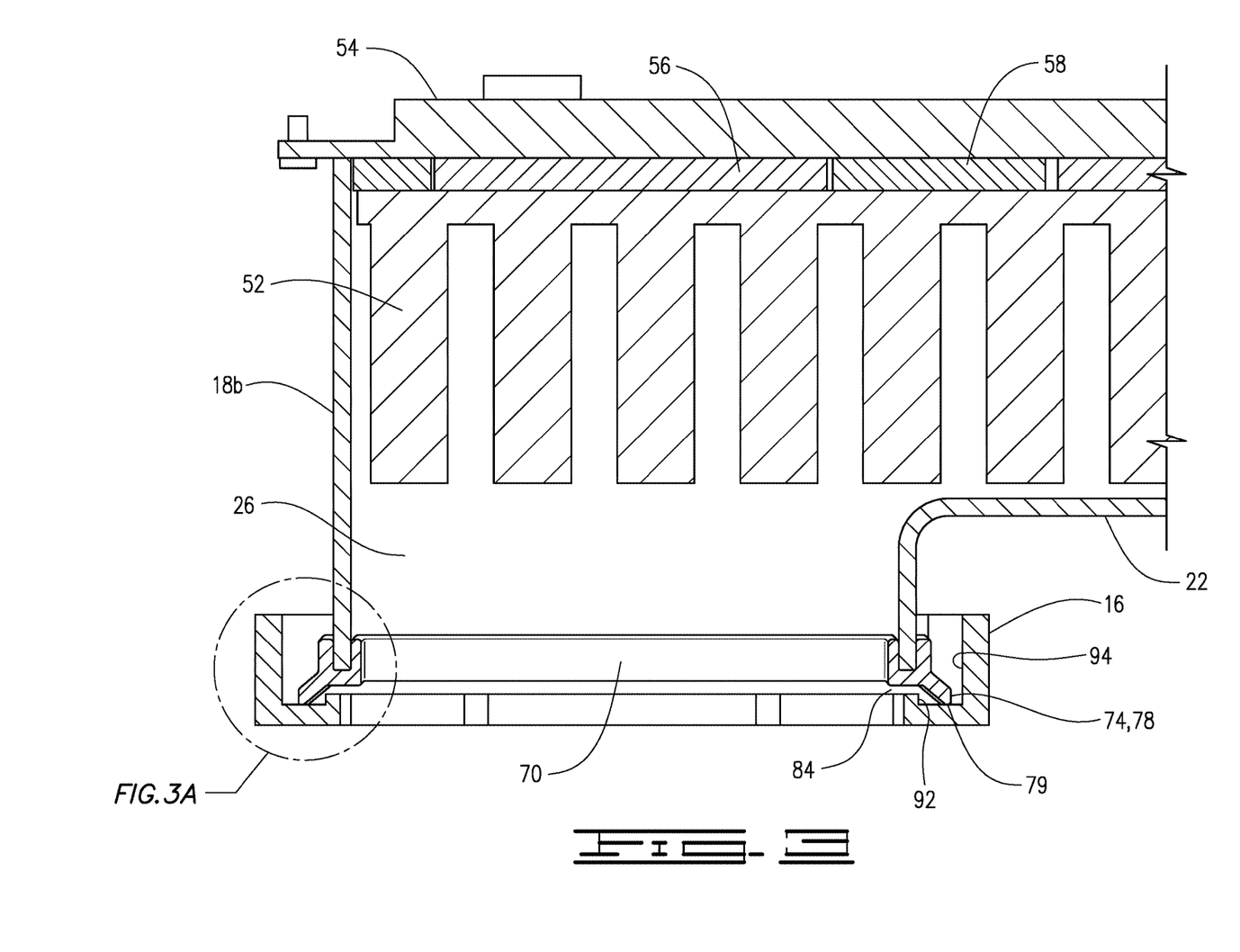
FIG. 3 is a side cut-away view of another embodiment of the motorized sample shaker system.
Figure 3A:
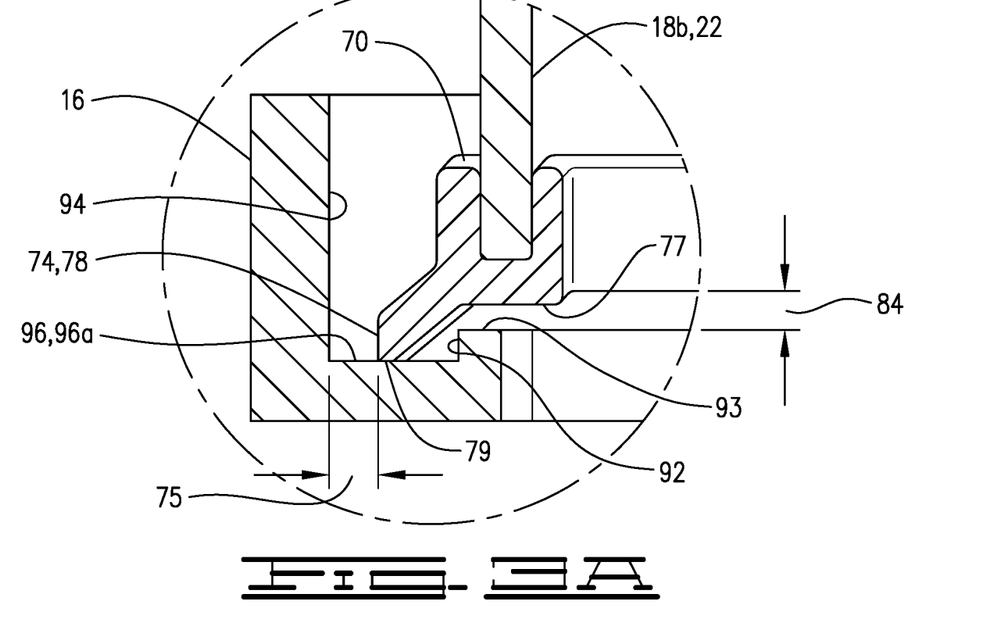
FIG. 3A is an enlarged view of Region A identified in FIG. 3.
Figure 8:
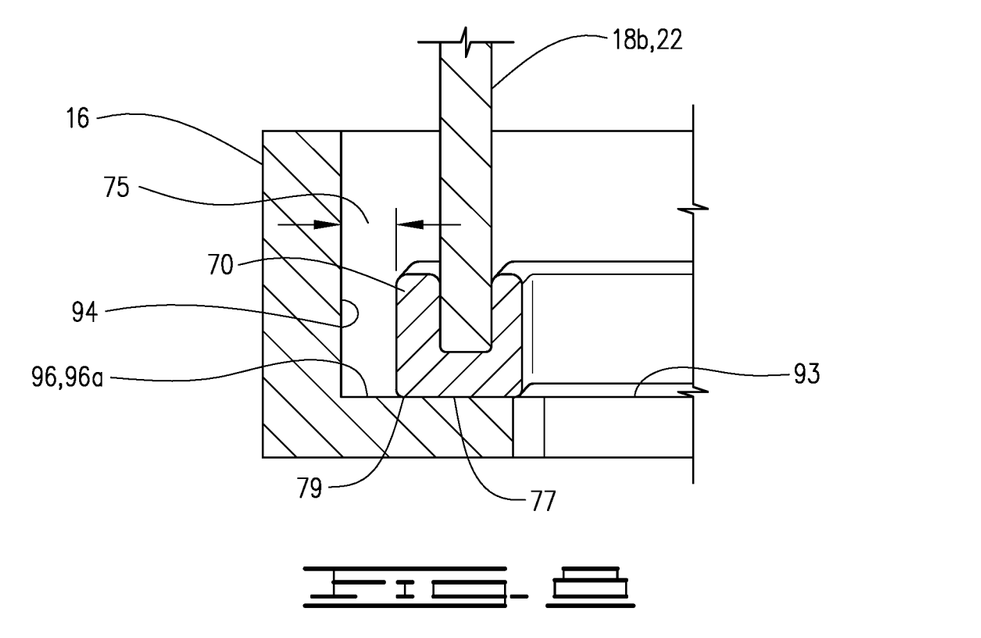
FIG. 8 depicts an alternative embodiment of compliant sliding seal.
Figure 9:
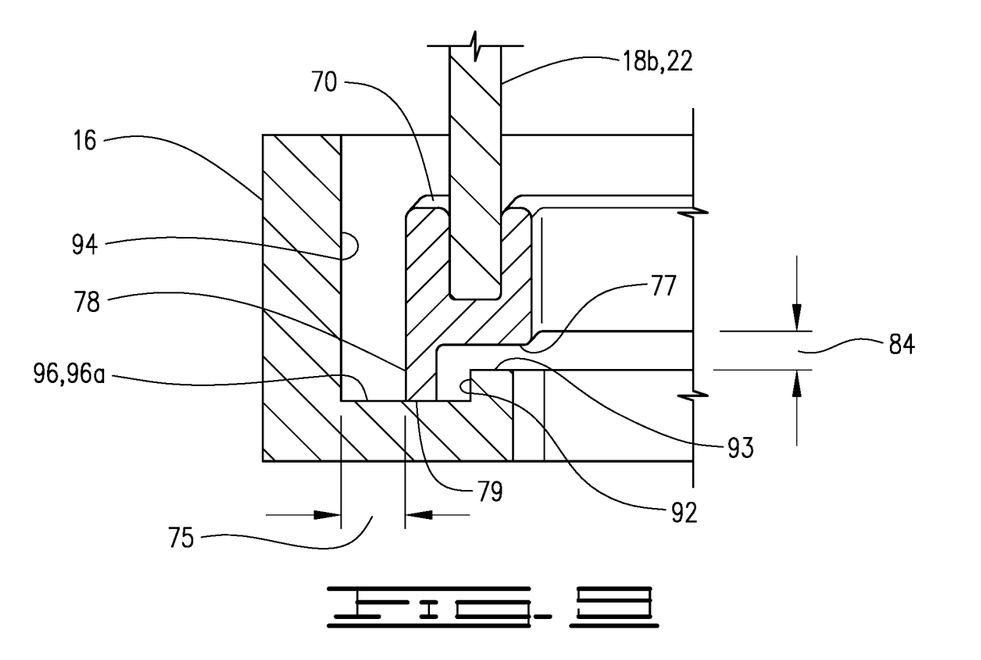
FIG. 9 depicts an alternative embodiment of compliant sliding seal.

Compliant sliding seal 70 generally has an outer diameter or length that is less than the inner diameter/length defined by first fan mount 16. As such, compliant sliding seal 70 is not a gasket or O-ring type seal which fills the gap between end 22 of air duct housing 18 and first fan mount 16. Rather, as depicted in FIGS. 3A, 8 and 9, a lateral gap 75 exists between the outer wall 74 of compliant sliding seal 70 and the outer wall 94 of first fan mount 16. FIG. 8 corresponds to the same area identified in FIG. 3 as FIG. 3A. Typically, when compliant sliding seal 70 is centrally located on upper surface 96 of first fan mount lateral gap 75 will be from about 0.5 mm to about 2.0 mm. More commonly, gap 75 will be from 0.7 mm to about 1.8 mm. Even more commonly, lateral gap 75 will be from about 1.0 mm to about 1.5 mm. While compliant sliding seal 70 is depicted in a generally square configuration in FIG. 4, other geometric shapes are suitable and will generally be determined by the configuration of the first fan mount 16 and/or air duct inlet 26. In most embodiments, compliant sliding seal 70 will permit relative motion between first fan mount 16 and air duct housing 18. The relative movement will generally occur between compliant sliding seal 70 and first fan mount 16. Accordingly, compliant sliding seal 70 is prepared from materials which will have a coefficient of friction between the two components between about 0.1μ and about 1.5μ.

Figure 2:
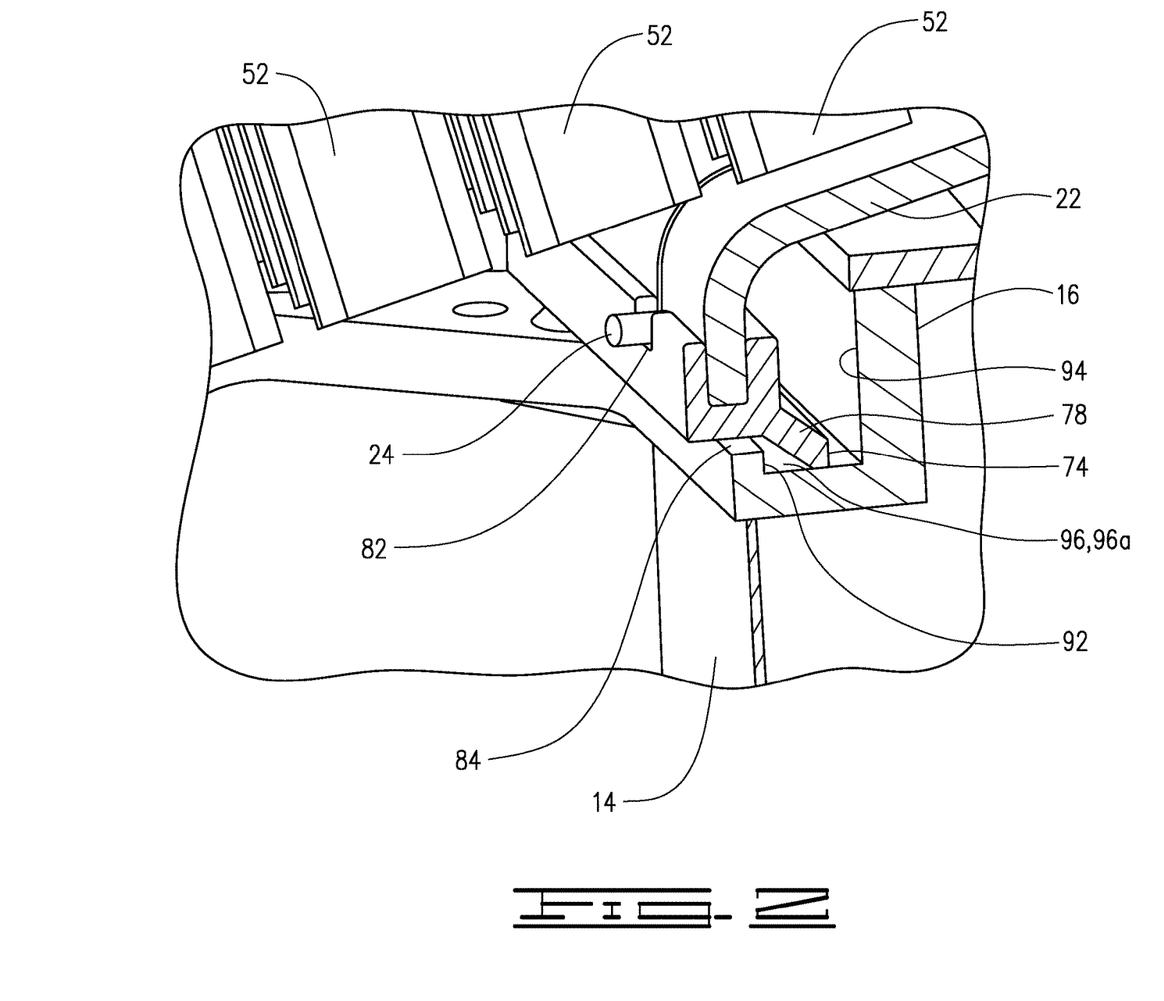
FIG. 2 is a perspective cut-away view of Region A identified in FIG. 1.

In another embodiment, compliant sliding seal 70 has a downwardly projecting sealing leg or sealing flange 78. Flange 78 provides a reduced contact point between compliant sliding seal 70 and first fan mount 16. As depicted in FIGS. 2-3A, upper surface 96 of first fan mount 16 may be defined by outer wall 94 and an inner wall 92. Thus, as depicted in FIGS. 2-3A, upper surface 96 has a configuration of a groove or channel 96a which receives downwardly projecting sealing flange 78. Optionally, the flange defining inner wall 92 may be omitted. In either configuration, downwardly projecting sealing flange 78 has a length sufficient to provide a vertical gap 84 between a lower surface 77 of compliant sliding seal 70 and the top 93 of inner wall 92 or upper surface 96. Typically, vertical gap 84 is between about 0.1 mm and about 1.2 mm. More commonly, vertical gap 84 is between about 0.2 mm and about 1.1 mm. More commonly vertical gap 84 is between 0.4 mm and about 1.1 mm. Even more typically, vertical gap 84 is between about 0.5 mm and about 1.0 mm.

Sealing flange 78 commonly projects outwardly and downwardly from outer wall 74 at an angle between about 25° and about 50°. More typically, sealing flange 78 projects outwardly and downwardly at an angle between about 35° and about 48°. More commonly, sealing flange 78 projects outwardly and downwardly at an angle between about 40° and about 47°. Alternatively, as depicted in FIG. 9, sealing flange 78 may project directly downward from compliant sliding seal 70 to contact upper surface 96. FIG. 9 corresponds to the same area identified in FIG. 3 as FIG. 3A. Sealing flange 78 typically has a length of about 3 mm to about 6 mm. More typically, the length will be between about 3.5 mm and about 5.0 mm. Even more commonly, the length will be between about 3.8 mm and about 4.4 mm. Sealing flange 78 terminates in a tip 79 having sufficient width and flexible consistency sufficient to ensure an air tight seal between air duct housing 18 and first fan mount 16.

Typically, tip 79 has a width between about 0.2 mm and about 1.2 mm. More typically, tip 79 has a width between about 0.3 mm and about 1.0 mm. Even more typically, tip 79 has a width between about 0.4 mm and about 0.8 mm. For most applications of sealed airflow system 5, tip 79 will have a total surface area between about 80 mm$^2$ and about 250 mm$^2$.

Thus, due to the flexible nature of sealing flange 78 and the configuration of components described above, compliant sliding seal 70 permits movement in both the horizontal and vertical planes. During operation of sample shaker assembly 50, vertical gap 84 may close from time to time; however, the nature of compliant sliding seal 70 will permit sufficient movement between components to ensure the consistent air tight seal of air duct housing 18. Additionally, sealing flange 78 has a coefficient of friction suitable to permit movement in the horizontal plane in the area constrained by outer wall 94 of first fan mount 16. To provide the desired coefficient of friction between about $0.1\mu$ and about $1.5\mu$, the total surface area of tip 79 is between about 80 mm$^2$ and about 250 mm$^2$. More typically, the total area of tip 79 is between about 90 mm$^2$ and about 200 mm$^2$. Even more typically, the total area of tip 79 is between about 100 mm$^2$ and about 150 mm$^2$.

Optionally, compliant sliding seal 70 and air duct housing 18 may be configured to provide an interlocking or alignment relationship between the components. One example of such a configuration is provided in FIGS. 2 and 4. As depicted in FIG. 2, air duct housing 18 has at least one optional positioning pin 24 positioned a distance above end 22. Compliant sliding seal 70 has at least one optional notch 82 positioned at a location corresponding to each pin 24. As depicted in FIG. 4, compliant sliding seal 70 has corresponding notches 82 on opposing sides; however, additional notches 82 and pins 24 may be used as necessary. Compliant sliding seal 70 may be prepared from polymeric materials, such as but not limited to: silicone, TPE, butyl rubber, EVA, fluoroelastomers.

Figure 5:
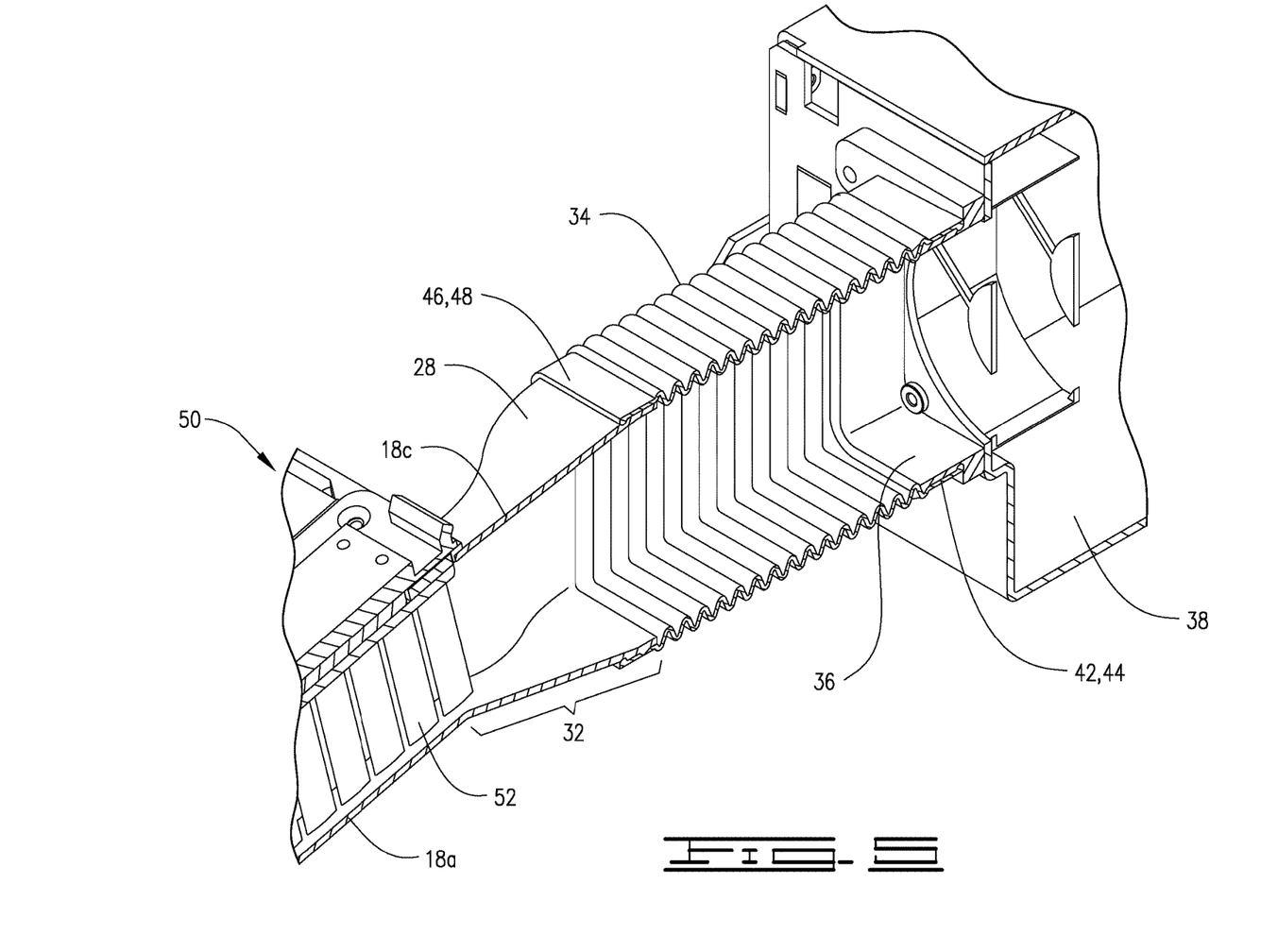
FIG. 5 is a side cut-away view of the flexible conduit joining the air duct outlet to the exhaust port.
Figure 6:
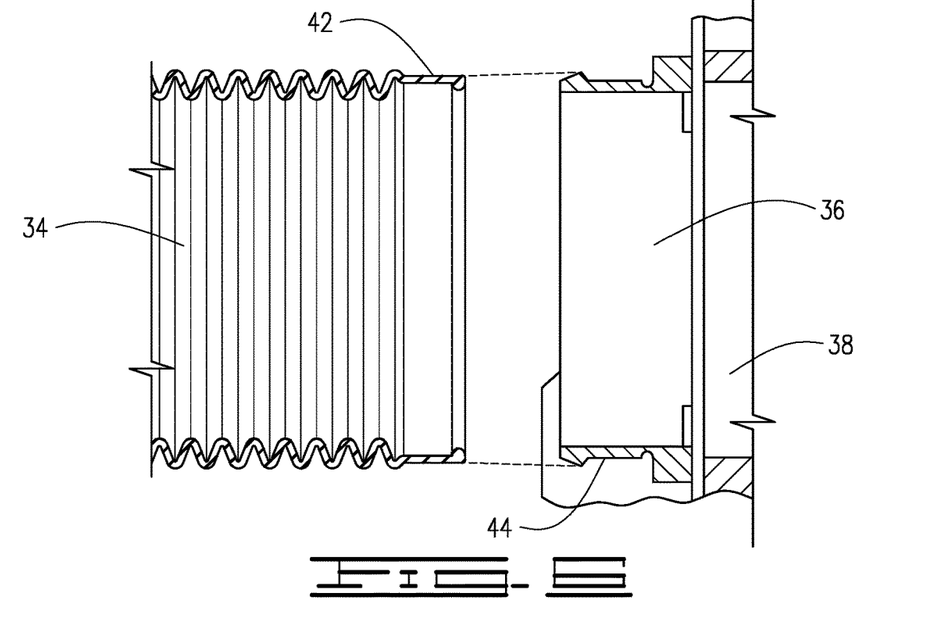
FIG. 6 is a side cut-away view of the flexible conduit and the exhaust port showing one embodiment of the connection components for joining the flexible conduit to the exhaust port in an air tight manner.
Figure 7:
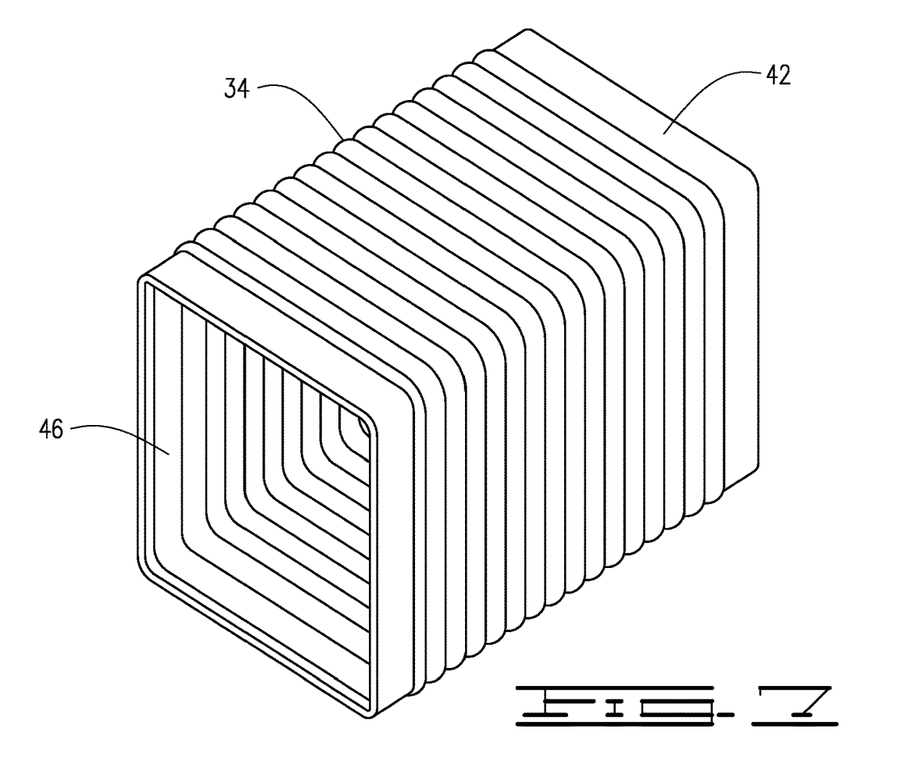
FIG. 7 is a perspective view of the flexible conduit.

As discussed above, compliant sliding seal 70 compensates for movement of sample shaker assembly 50 with regard to the air intake side of sealed airflow control system 5. In most embodiments, air duct outlet 28 will also be provided with a movement compensator. As depicted in FIGS. 1 and 5, a flexible conduit 34 joins air duct outlet 28 to an exhaust port 36 in an air tight manner. In one embodiment, air duct outlet 28 has a coupler 48 which deflects to permit passage of a corresponding flange 46 carried by the inlet of flexible conduit 34. Thus, when flange 46 passes over coupler 48, the two components engage to secure flexible conduit 34 to air duct outlet 28 in an air tight manner. Likewise, exhaust port 36 has a coupler 44 which deflects to permit passage of a corresponding flange 42 carried by the outlet of conduit 34. Thus, when flange 42 passes over coupler 44, the two components engage to secure flexible conduit 34 to exhaust port 36. Other options are available for securing flexible conduit 34 to air duct outlet 28 and exhaust port 36 in an air tight manner.

Flexible conduit 34 compensates for movement of sample shaker assembly 50 in a manner that does not permit unwanted airflow into or out of sealed airflow control system 5. To provide the desired compensation, flexible conduit permits between about 0.3 mm and about 1.2 mm of lateral movement. More typically, flexible conduit 34 permits between about 0.4 mm and about 1.1 mm of lateral movement. Even more typically, flexible conduit permits between about 0.5 mm and about 1.0 mm of lateral movement. Additionally, flexible conduit 34 permits between about 0.1 mm and about 1.2 mm of vertical movement. More typically, flexible conduit permits between about 0.2 mm and about 0.8 mm of vertical movement. Even more typically, flexible conduit 34 permits between about 0.22 mm and about 0.5 mm of vertical movement. Thus, flexible conduit 34 provides air tight fluid flow between air duct housing 18 and exhaust port 36. Flexible conduit 34 may be a corrugated tube or any other flexible conduit suitable for use under the temperature and operational conditions of sample shaker assembly 50. Downstream of exhaust port 36 is an optional second fan/fan mount 38 and other operational control components.

Figure 10:
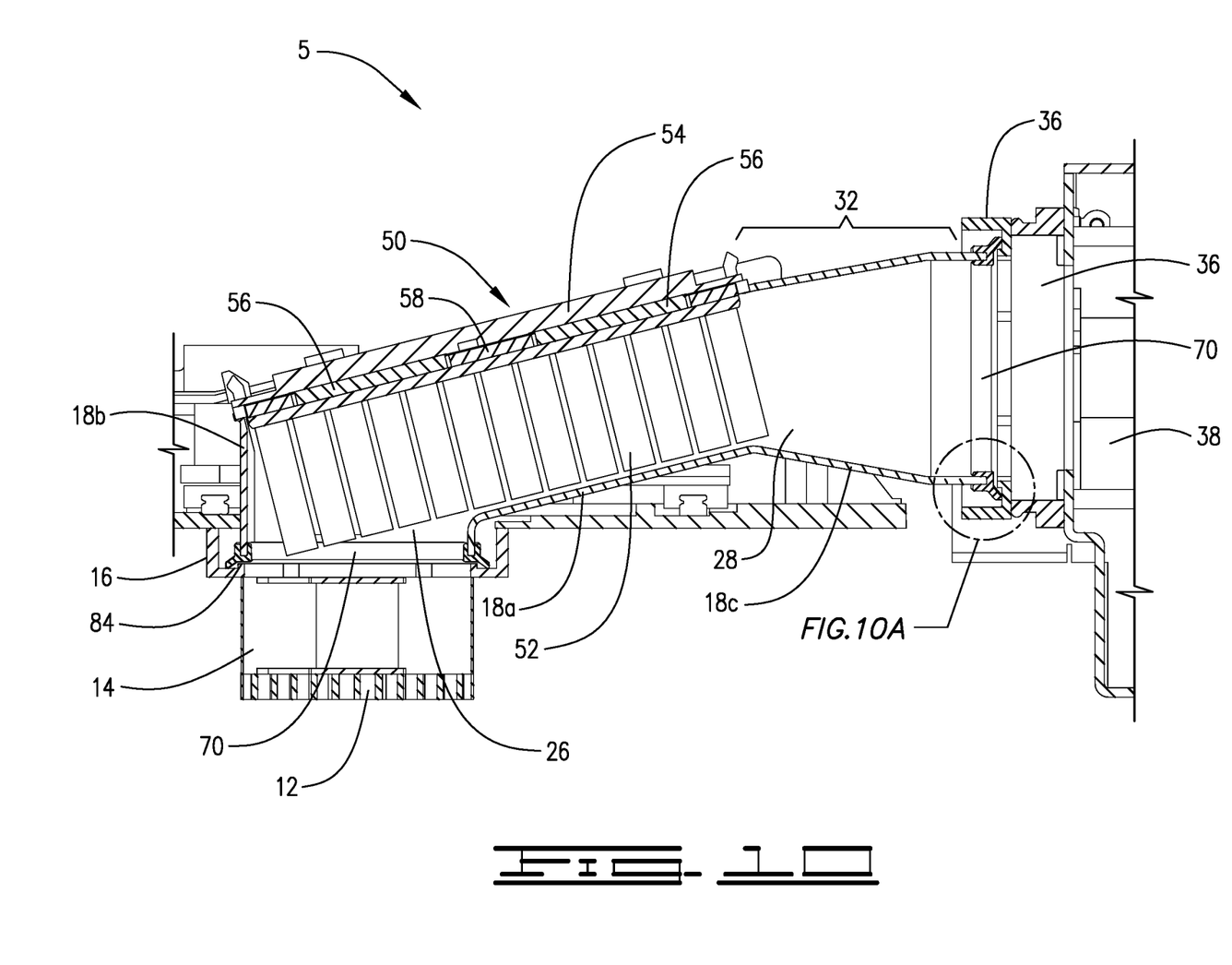
FIG. 10 is a side cut-away view of an alternative embodiment of the sealed airflow system.
Figure 10A:
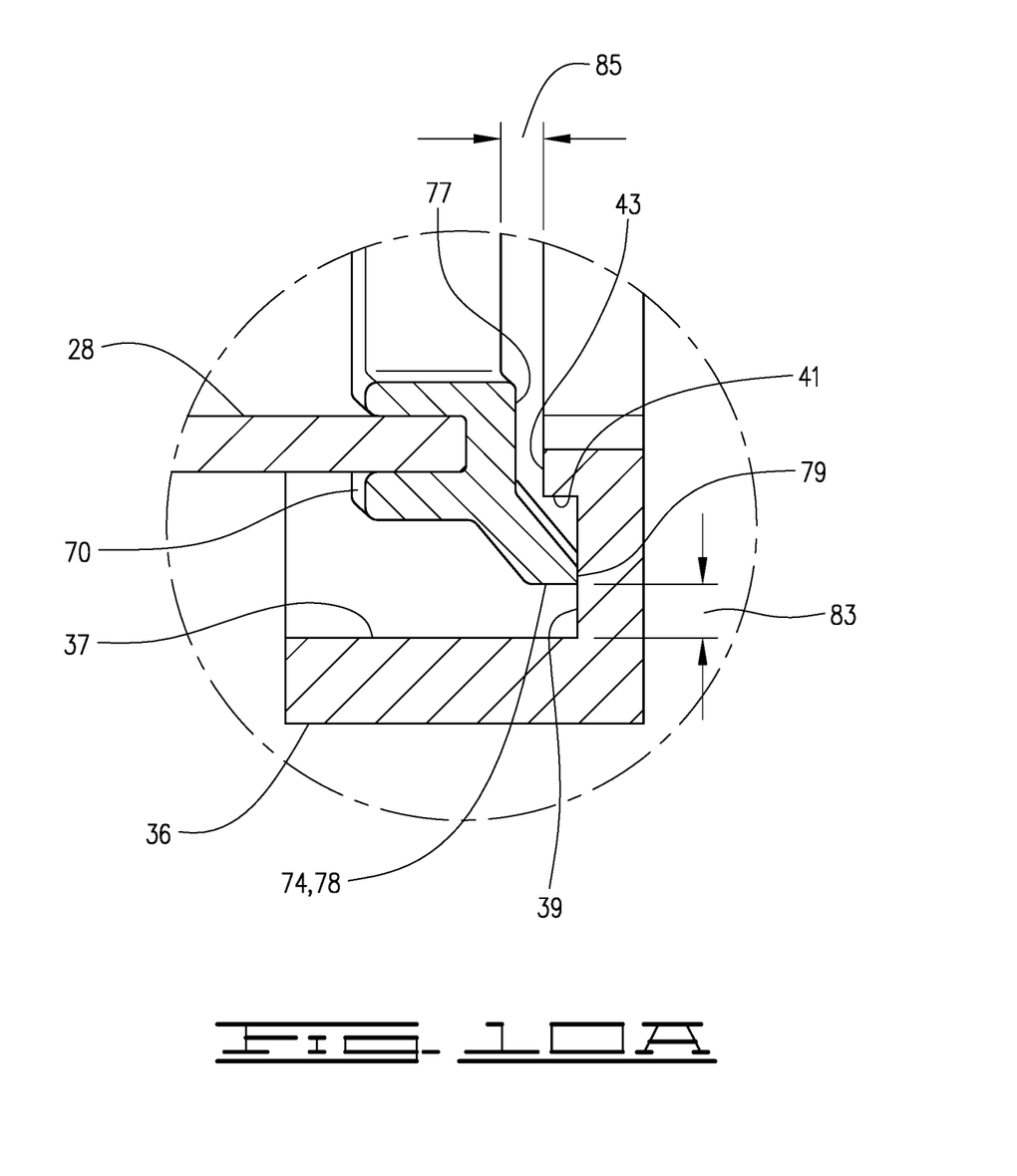
FIG. 10A is an enlarged view of Region A in FIG. 10.

FIG. 10 depicts an alternative embodiment wherein flexible conduit 34 has been replaced by a second compliant sliding seal 70. In this embodiment, air duct outlet 28 corresponds generally to air duct inlet 26 and exhaust port 36 corresponds generally to first fan mount 16 with second compliant sliding seal 70 located between air duct outlet 28 and exhaust port 36. Thus, during operation of sample shaker assembly 50 or other unit, second compliant sliding seal 70 permits movement of air duct outlet 28 relative to exhaust port 36 while maintaining an air tight seal between the two components. The dimensional relationship of second compliant sliding seal 70 and air duct outlet 28 and exhaust port 36 correspond to the dimensions described above with regard to compliant sliding seal 70 located between first fan mount 16 and sealing flange 78 of air duct inlet 26. Likewise, when compliant sliding seal 70 includes sealing flange 78, sealing flange 78 will contact exhaust port 36 and provide the same clearances as described above with regard to sealing flange 78 and first fan mount 16.

For clarity, when compliant sliding seal 70 is used in place of flexible conduit 34, gap 83 will exist between outer wall 74 of compliant sliding seal 70 and exhaust port wall 37. Typically, when compliant sliding seal 70 is centrally located on exhaust port surface 39, gap 83 will be from about 0.5 mm to about 2.0 mm. More commonly, gap 83 will be from 0.7 mm to about 1.8 mm. Even more commonly, gap 83 will be from about 1.0 mm to about 1.5 mm. If compliant sliding seal 70 includes sealing flange 78, exhaust port surface 39 may optionally be defined by a flange 41. As such exhaust port wall 37, exhaust port surface 39 and flange 41 define a groove or channel. With or without flange 41, sealing flange 78 has a length sufficient to provide a gap 85 between exhaust port surface 39 or the top 43 of flange 41 and lower surface 77 of compliant sliding seal 70. Typically, gap 85 is between about 0.1 mm and about 1.2 mm. More commonly, gap 85 is between about 0.2 mm and about 1.1 mm. More commonly gap 85 is between 0.4 mm and about 1.1 mm. Even more typically, gap 85 is between about 0.5 mm and about 1.0 mm.

The configuration of sealing flange 78 is unchanged from the application of compliant sliding seal 70 at air duct inlet 26. The terms outwardly and downwardly being relative to position of compliant sliding seal 70 at air duct inlet 26 and one skilled in the art will recognize that when used at exhaust port 36, compliant sliding seal 70 has been rotated ninety degrees. Also, one skilled in the art will recognize that joinder of components can take place at many different angles other than vertical and horizontal as currently depicted in the FIGS.

In both locations, compliant sliding seal 70 will permit movement of adjacent components without loss of an air tight seal between the components. As depicted in FIG. 10, sealing flange 78 permits movement in both the vertical and horizontal planes. Likewise, movement in the other plane is constrained by exhaust port wall 37 and outer wall 74 of compliant sliding seal 70. As previously discussed, outer wall 74 may be located on sealing flange 78.

In some embodiments, sample shaker assembly 50 has an outer flange, not shown, which supports sample shaker assembly 50 within an opening, not shown, located in the upper surface of air duct housing 18. In such an embodiment, sample shaker assembly 50 may be bonded or otherwise sealed to the upper surface of air duct housing 18. In other embodiments, air duct housing 18 may be secured directly to sample shaker assembly 50. The manner of joining sample shaker assembly 50 and other units to air duct housing 18 is not critical so long as the manner ensures an air tight fit between the two components.

When sample shaker assembly 50 is secured to or positioned on air duct housing 18, thermal control devices 56 and insulators 58 may be located above, below or in line with the upper surface of air duct housing 18. Thermal conductors 52 are located to the interior of air duct housing 18 such that thermal conductors 52 can shed heat energy to air moving through air duct housing 18. The controller for the system monitors the temperature of the sample wells in the upper surface of the shaker plate 54 and controls the operation of first fan 14 and optional second fan 38, as needed, to manage removal of heat from thermal conductors 52.

Thus, sealed airflow system 5 provides air duct housing 18 as an airtight controlled environment suitable for directing a controlled amount of air from first fan 14, over thermal conductors 52, through air duct outlet 28 to exhaust port 36 thereby controlling heat removal from shaker plate 54. Compliant sliding seal 70 and flexible conduit 34 permit continuous mixing of samples in the sample wells without damaging the components of sealed airflow control system 5.

Other embodiments of the present invention will be apparent to one skilled in the art. As such, the foregoing description merely enables and describes the general uses and methods of the present invention. Accordingly, the following claims define the true scope of the present invention.

What is claimed is:

1. A sealed airflow system comprising:
    an air intake housing;
    an air duct housing, said air duct housing including an air inlet in fluid communication with said air intake housing and an air outlet;
    an opening in said air duct housing;
    a sample shaker assembly positioned within said opening, said sample shaker assembly sealed in an airtight manner to said air duct housing, said sample shaker assembly including at least one thermal conductor positioned to an interior of said air duct housing such that air passing from said air inlet to said air outlet flows over said thermal conductor;
    said air duct housing configured to direct flowing air from said air intake housing to said air outlet;
    a first compliant sliding seal positioned between said air inlet and said air intake housing, said first compliant sliding seal comprising;
        a lower surface;
        a central opening, said central opening provides fluid communication through said first compliant sliding seal and between said air inlet and said air intake housing; and,
        an outer wall.

2. The sealed airflow system of claim 1, further comprising an exhaust port, said exhaust port in fluid communication with said air outlet and a movement compensator positioned between said air duct housing air outlet and said exhaust port, said movement compensator permits from about 0.3 mm to about 1.2 mm of lateral movement and from about 0.1 mm to about 1.2 mm of vertical movement while maintaining an air tight seal between said air outlet of said air duct housing and said exhaust port.

3. The sealed airflow system of claim 2, wherein said movement compensator is selected from the group consisting of a second compliant sliding seal and a flexible conduit.

4. The sealed airflow system of claim 1, wherein said air intake housing has an outer wall and an upper surface, and wherein said first compliant sliding seal further comprises a lower surface and a sealing flange, only said sealing flange portion of said first compliant sliding seal contacts said upper surface of said intake housing and said sealing flange having a length sufficient to provide a first gap between the lower surface of said first compliant sliding seal and said upper surface of said air intake housing.

5. The sealed airflow system of claim 4, wherein said first gap between the lower surface of said first compliant sliding seal and said upper surface of said air intake housing is between about 0.1 mm and about 1.1 mm.

6. The sealed airflow system of claim 4, wherein said sealing flange ends in a tip that has a width of about 0.2 mm to about 1.2 mm, said tip of said sealing flange contacts said upper surface of said intake housing.

7. The sealed airflow system of claim 4, wherein the coefficient of friction between said tip of said sealing flange and said upper surface of said air intake housing is between about $0.1\mu$ and about $1.5\mu$.

8. The sealed airflow system of claim 7, wherein said tip of said sealing flange defines a total surface area between about 80 mm$^2$ and about 250 mm$^2$.

9. The sealed airflow system of claim 4, wherein said sealing flange projects outwardly and downwardly from said outer wall of said first compliant sliding seal at an angle between about 25° and about 50°, said sealing flange having a length of about 3 mm to about 6 mm, said sealing flange terminating in a tip that has a width of about 0.2 mm to about 1.2 mm, such that only said tip of said sealing flange contacts said upper surface of said air intake housing.

10. The sealed airflow system of claim 1, wherein said air intake housing has an outer wall and an upper surface, and wherein said air intake housing and said first compliant sliding seal are configured such that a second gap exists between said outer wall of said air intake housing and said outer wall of said first compliant sliding seal.

11. The sealed airflow system of claim 10, wherein said second gap between said outer wall of said air intake housing and said outer wall of said first compliant sliding seal is between about 0.5 mm to about 2.0 mm.

12. The sealed airflow system of claim 1, wherein the coefficient of friction between said first compliant sliding seal and said air intake housing is between about $0.1\mu$ and about $1.5\mu$.

13. A sealed airflow system comprising:
    an air intake housing, said air intake housing having an upper surface and an inner wall and an outer wall;
    an air duct housing, said air duct housing including an air inlet in fluid communication with said air intake housing and an air outlet;
    an opening in said air duct housing,
    a sample shaker assembly positioned within said opening and said sample shaker assembly sealed in an airtight manner to said air duct housing, said sample shaker assembly including at least one thermal conductor positioned to an interior of said air duct housing such that air passing from said air inlet to said air outlet flows over said thermal conductor;

said air duct housing configured to direct flowing air from said air intake housing to said air outlet;

a first compliant sliding seal positioned between said air inlet defined by a lower leg of said air duct housing and a fan mount, said first compliant sliding seal comprising;

a lower surface;

a central opening, said central opening provides fluid communication through said first compliant sliding seal and between said air inlet and said air intake housing;

an outer wall;

a sealing flange projecting outwardly and downwardly from said outer wall said sealing flange terminating in a tip, said tip of said sealing flange engages said upper surface of said air intake housing;

said sealing flange having a length sufficient to define a first gap between the lower surface of said first compliant sliding seal and the upper surface of said air intake housing.

14. The sealed airflow system of claim 13, further comprising an exhaust port, said exhaust port in fluid communication with said air outlet and a movement compensator positioned between said air duct housing air outlet and said exhaust port, said movement compensator permits from about 0.3 mm to about 1.2 mm of lateral movement and from about 0.1 mm to about 1.2 mm of vertical movement while maintaining an air tight seal between said air outlet of said air duct housing and said exhaust port.

15. The sealed airflow system of claim 14, wherein said movement compensator is selected from the group consisting of a second compliant sliding seal and a flexible conduit.

16. The sealed airflow system of claim 13, wherein said sealing flange projects outwardly and downwardly from said outer wall at an angle between about 25° and about 50°, said sealing flange having a length of about 3 mm to about 6 mm, said sealing flange terminating in a tip that has a width of about 0.2 mm to about 1.2 mm and only said sealing flange portion of said first compliant sliding seal contacts said upper surface of said air intake housing.

17. The sealed airflow system of claim 16, wherein the first gap between the lower surface of said first compliant sliding seal and said upper surface of said air intake housing is between about 0.1 mm and about 1.1 mm.

18. The sealed airflow system of claim 16, wherein said tip of said sealing flange tip has a width of about 0.2 mm to about 1.2 mm, only said tip of said sealing flange contacts said upper surface of said intake housing.

19. The sealed airflow system of claim 16, wherein the coefficient of friction between said tip of said sealing flange and said upper surface of said fan mount is between about $0.1\mu$ and about $1.5\mu$.

20. The sealed airflow system of claim 16, wherein said sealing flange projects outwardly and downwardly from said outer wall of said first compliant sliding seal at an angle between about 25° and about 50°, said sealing flange having a length of about 3 mm to about 6 mm, said sealing flange terminating in a tip that has a width of about 0.2 mm to about 1.2 mm, such that only said tip of said sealing flange contacts said upper surface of said air intake housing.

21. The sealed airflow system of claim 13, wherein said air intake housing has an outer wall and an upper surface, and wherein said air intake housing and said first compliant sliding seal are configured such that a second gap exists between said outer wall of said air intake housing and an outer wall of said sealing flange portion of said first compliant sliding seal.

22. The sealed airflow system of claim 21, wherein said second gap between said inner wall of said air intake housing and said outer wall of said first compliant sliding seal is between about 0.5 mm to about 2.0 mm.

23. The sealed airflow system of claim 13, wherein said tip of said sealing flange defines a total surface area between about 80 mm$^2$ and about 250 mm$^2$.

24. A sealed air flow airflow system comprising:

an air intake housing;

an air duct housing, the air duct housing including an air inlet in fluid communication with the air intake housing and an air outlet;

the air duct housing configured to direct flowing air from the air intake housing to the air outlet;

a sample shaker assembly attached to the air duct housing, the sample shaker assembly includes at least one thermal conductor positioned within an interior of the air duct housing;

a first compliant sliding seal positioned between the air duct housing and the air intake housing, the first compliant sliding seal comprising;

an outer wall; and a sealing flange.

25. A sealed airflow system comprising:

an air intake housing, said air intake housing having an upper surface and an inner wall and an outer wall;

an air duct housing, said air duct housing including an air inlet in fluid communication with said air intake housing and an air outlet;

said air duct housing configured to direct flowing air from said air intake housing to said air outlet;

a first compliant sliding seal positioned between said air inlet defined by a lower leg of said air duct housing and a fan mount, said first compliant sliding seal comprising;

a lower surface;

a central opening, said central opening provides fluid communication through said first compliant sliding seal and between said air inlet and said air intake housing;

an outer wall;

a sealing flange projecting outwardly and downwardly from said outer wall said sealing flange terminating in a tip, said tip of said sealing flange engages said upper surface of said air intake housing;

said sealing flange having a length sufficient to define a first gap between the lower surface of said first compliant sliding seal and the upper surface of said air intake housing said air intake housing and said first compliant sliding seal define a second gap between said outer wall of said air intake housing and an outer wall of said sealing flange portion of said first compliant sliding seal.

\* \* \* \* \*